United States Patent [19]
Matsuoka et al.

[11] Patent Number: 5,901,914
[45] Date of Patent: May 11, 1999

[54] RECORDING AND/OR REPRODUCING APPARATUS PERMITTING SELECTIVE USE OF CASSETTES OF DIFFERENT SIZES

[75] Inventors: Hidetoshi Matsuoka; Junji Kobayashi, both of Tokyo; Michihiko Tsunekawa, Kanagawa-ken, all of Japan

[73] Assignee: Canon Kabushiki Kaisha, Tokyo, Japan

[21] Appl. No.: 08/874,795

[22] Filed: Jun. 13, 1997

Related U.S. Application Data

[63] Continuation of application No. 08/645,043, May 6, 1996, abandoned, which is a continuation of application No. 08/289,235, Aug. 11, 1994, abandoned.

[30] Foreign Application Priority Data

Aug. 27, 1993 [JP] Japan .................................... 5-235936

[51] Int. Cl.$^6$ ............................ G11B 23/04; G11B 5/008
[52] U.S. Cl. .............................................. 242/336; 360/94
[58] Field of Search ................................ 242/336; 360/94

[56] References Cited

U.S. PATENT DOCUMENTS

| 4,903,149 | 2/1990 | Hasegawa et al. ................... 360/94 X |
| 4,984,109 | 1/1991 | Yokoo ................................. 242/336 X |
| 5,082,195 | 1/1992 | Saito et al. ............................... 242/336 |
| 5,314,141 | 5/1994 | Ishii et al. ................................ 242/336 |

Primary Examiner—John Q. Nguyen
Attorney, Agent, or Firm—Robin, Blecker & Daley

[57] ABSTRACT

A reel mount moving device for moving a reel mount to the position of each reel contained in each of a plurality of cassettes of different sizes, with any of the cassettes mounted, includes the reel mount which is arranged to be rotated by a power of a drive source for moving a recording medium, a converting member for converting the power of the drive source into a force of moving the reel mount, and a switching member arranged to cause the converting action of the converting member to be selectively turned on or off.

8 Claims, 8 Drawing Sheets

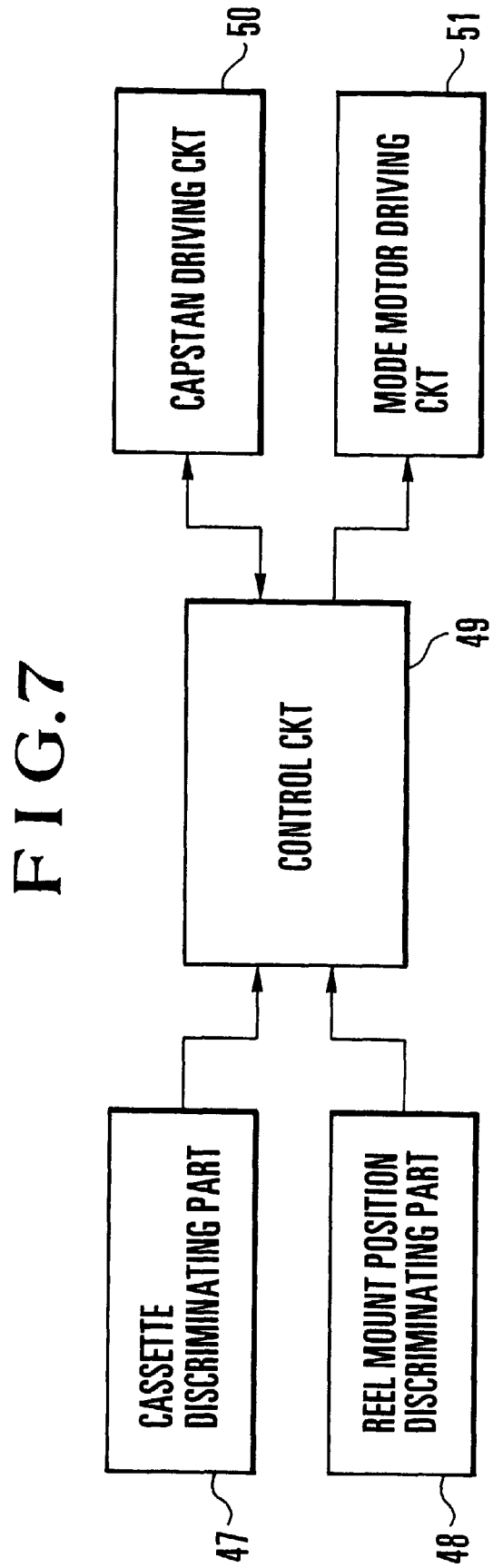

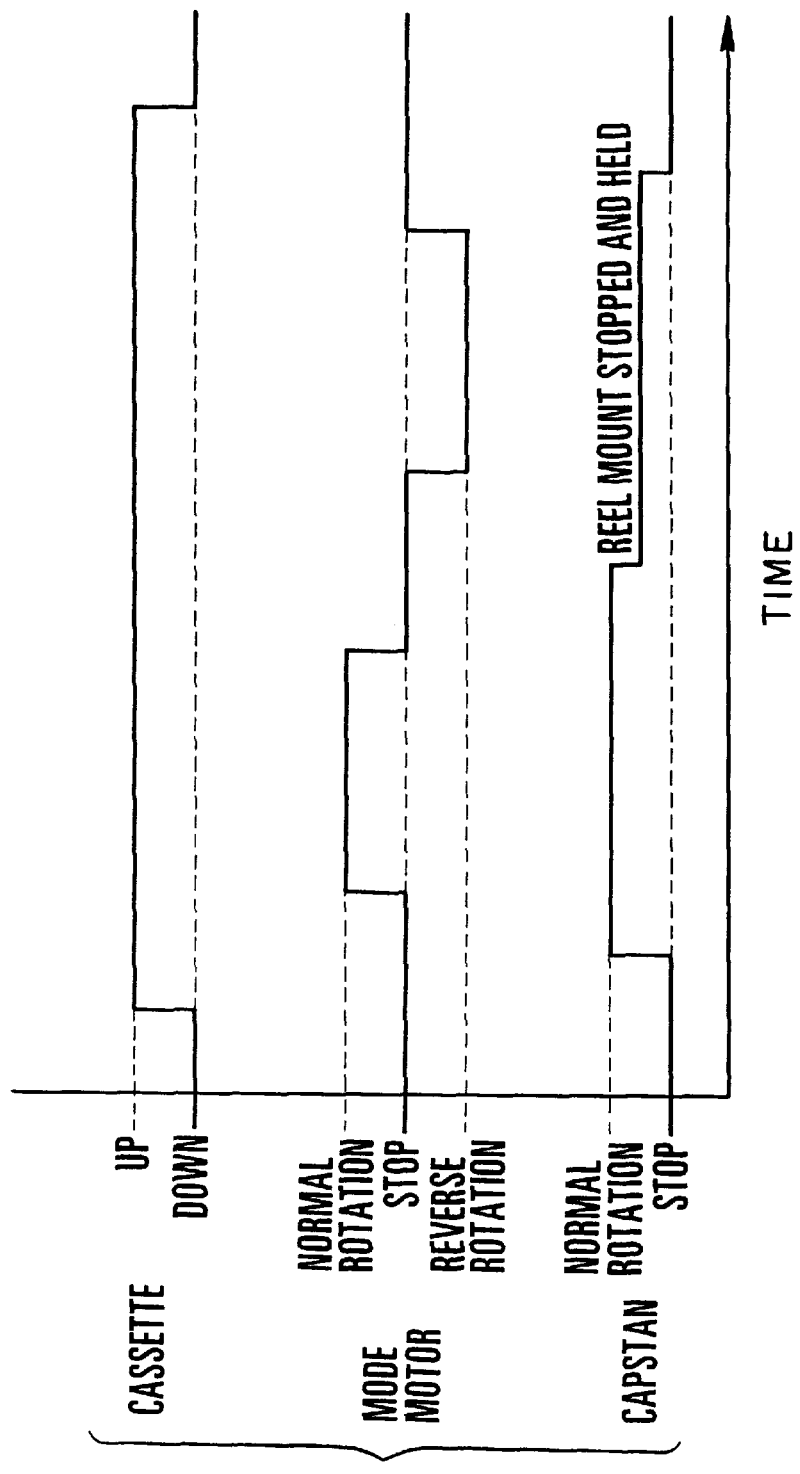

RECORDING AND/OR REPRODUCING APPARATUS PERMITTING SELECTIVE USE OF CASSETTES OF DIFFERENT SIZES

This is a continuation application under 37 CFR 1.62 of prior application Ser. No. 08/645,043 filed on May 6, 1996 (aban.); which is a continuation of Ser. No. 08/289,235 filed Aug. 11, 1994, abandoned.

BACKGROUND OF THE INVENTION

1. Field of the Invention

This invention relates to a recording and/or reproducing apparatus and more particularly to a reel mount moving device arranged to permit selective use of ones of a plurality of cassettes of different sizes in a recording and/or reproducing apparatus such as a VTR.

2. Description of the Related Art

The reel mount moving device of the above-stated kind has been arranged to move the reel mount between a plurality of reel positions by driving the reel mount with a motor provided solely for moving the reel mount in such a manner as to allow the reel mount to engage each reel disposed in each of a plurality of tape cassettes of different sizes which are selectively mounted on the apparatus.

In the conventional reel mount moving device, however, the reel mount which is of a considerably large size must be moved a predetermined distance. The motor therefore must have a large torque. The reel mount moving device thus has necessitated use of a relatively expensive and large motor for moving the reel mount. However, since the reel mount moving motor is used only in mounting a tape cassette and not in recording nor in reproduction, the performance of the conventional reel mount moving device has been inefficient in terms of cost and space.

SUMMARY OF THE INVENTION

It is, therefore, an object of this invention to provide a reel mount moving device or a recording and/or reproducing apparatus having a reel mount moving device which is arranged to obviate the necessity of having any motor solely for the purpose of moving a reel mount.

To attain this object, a reel mount moving device for moving a reel mount to a position of each reel contained in each of a plurality of cassettes of different sizes, in correspondence with selective mounting of one of the plurality of cassettes, is arranged as an embodiment of this invention to include a reel mount arranged to be rotated by a power of a drive source for driving a recording medium, converting means for converting the power of the drive source into a force of moving the reel mount, and switching means for causing a converting action of the converting means to be selectively turned on or off.

To attain the same object, a recording and/or reproducing apparatus which is arranged also according to this invention to permit one of a plurality of cassettes of different sizes to be selectively mounted thereon includes a head arranged to record or reproduce information on or from a tape contained in each of the plurality of cassettes, transport means for transporting the tape, a reel mount arranged to be rotated by a driving force of the transport means, converting means for converting a rotating force of the reel mount into a force of moving the reel mount, and switching means for causing a converting action of the converting means to be selectively turned on or off.

The above and other objects and features of this invention will become apparent from the following detailed description of embodiments thereof taken in connection with the accompanying drawings.

BRIEF DESCRIPTION OF THE DRAWINGS

FIG. 7 is a block diagram showing a control system of the same embodiment.

FIG. 8 is a timing chart showing the actions of the embodiment performed in moving the reel mount from the large cassette position to the small cassette position.

DETAILED DESCRIPTION OF THE PREFERRED EMBODIMENT

Figure 1:
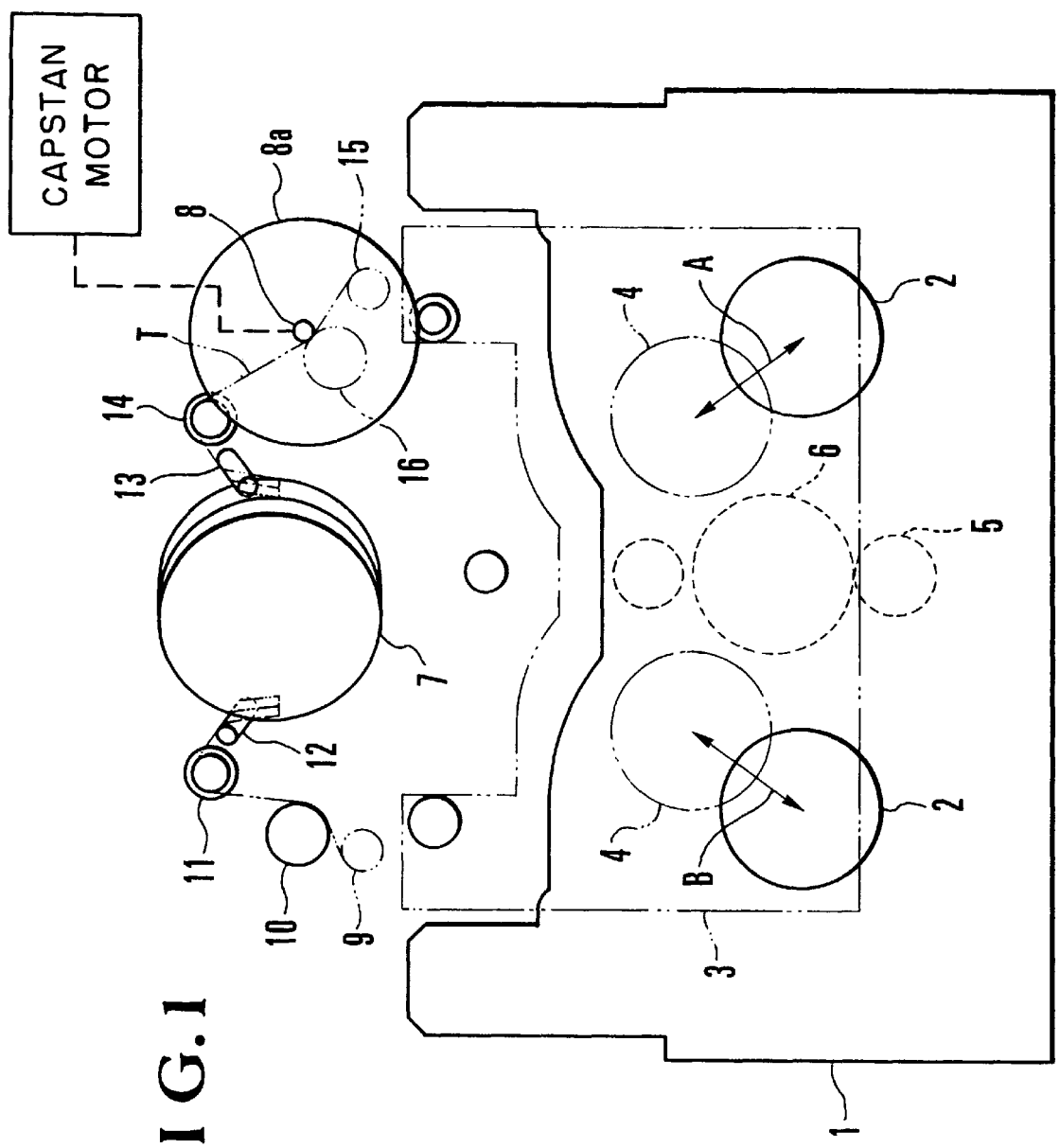
FIG. 1 is a plan view showing in outline a reel mount moving device of a cassette type VTR arranged as an embodiment of this invention to permit selective use of a large cassette or a small cassette.

This invention is described through a reel mount moving device which is arranged in a cassette type VTR according to this invention as shown in the drawings.

FIG. 1 is a plan view showing in outline the VTR in which the reel mount moving device is arranged according to this invention to permit selective use of either a large cassette or a small cassette.

In FIG. 1, reference numeral 1 denotes a large cassette. A pair of reel hubs 2 are arranged within the large cassette 1. A small cassette 3 has a pair of reel hubs 4 arranged therein. As apparent from the drawing, the position of a pair of reel mounts which will be described later must be moved in the directions of arrows A and B to a position corresponding to the reel hubs 2 or to another position corresponding to the reel hubs 4.

The illustration of FIG. 1 includes a reel mount driving gear 5 and a swinging gear 6. A pair of reel mounts are selectively caused to rotate by a swing of the swinging gear 6. A rotary head drum 7 is provided with a rotary head. The illustration further includes a capstan 8, guide posts 9 to 15 and a pinch roller 16. A magnetic tape T which is pulled out from the large or small cassette 1 or 3 is fed and transported jointly by the capstan 8 and the pinch roller 16.

The details of the reel mount moving device of this embodiment are described with reference to FIGS. 2 to 8 as follows.

Figure 2:
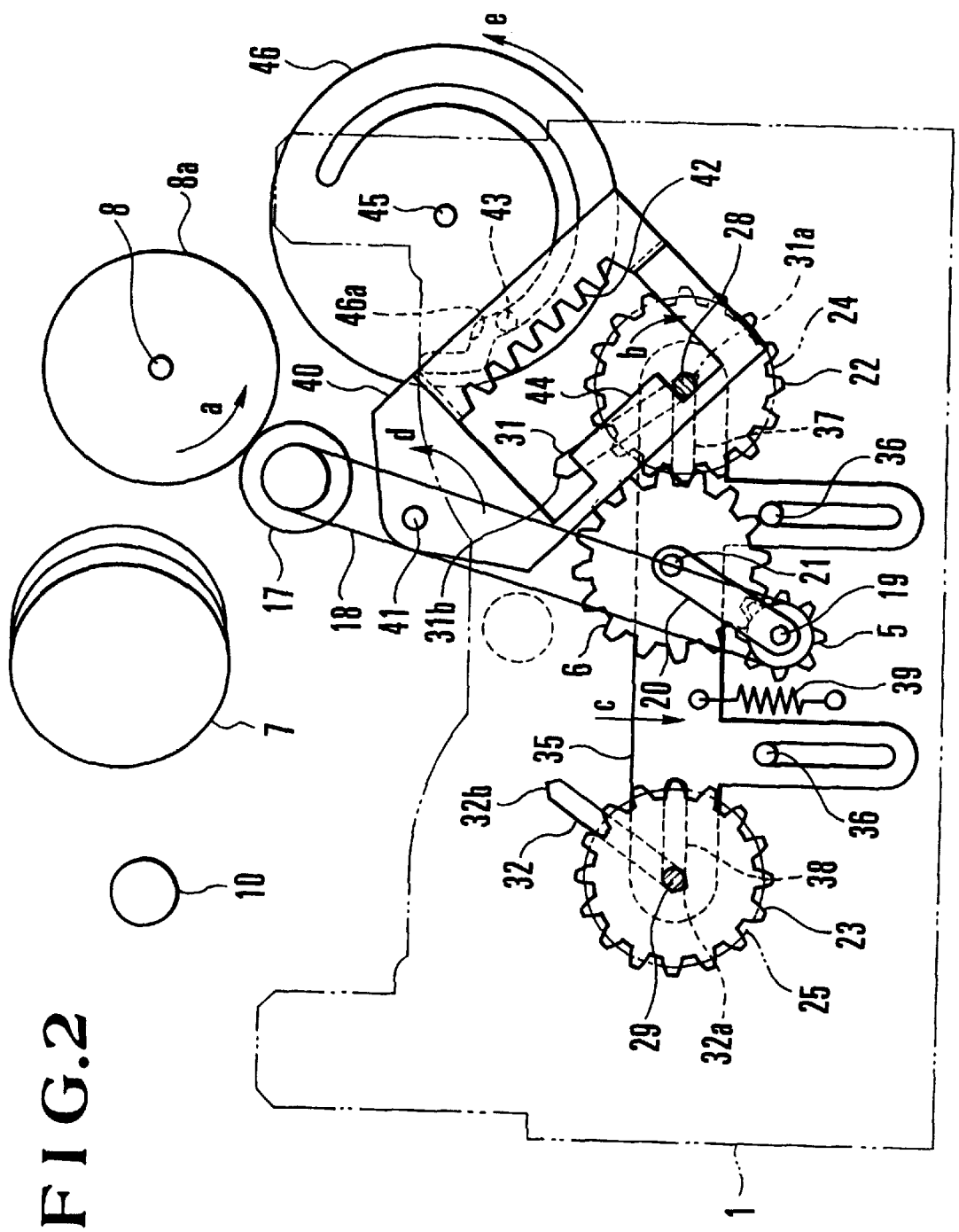
FIG. 2 is a plan view showing the whole of the reel mount moving device of the same embodiment in a state of having a reel mount set in a large cassette position to permit recording or reproducing on or from a tape contained in the large cassette.
Figure 3:
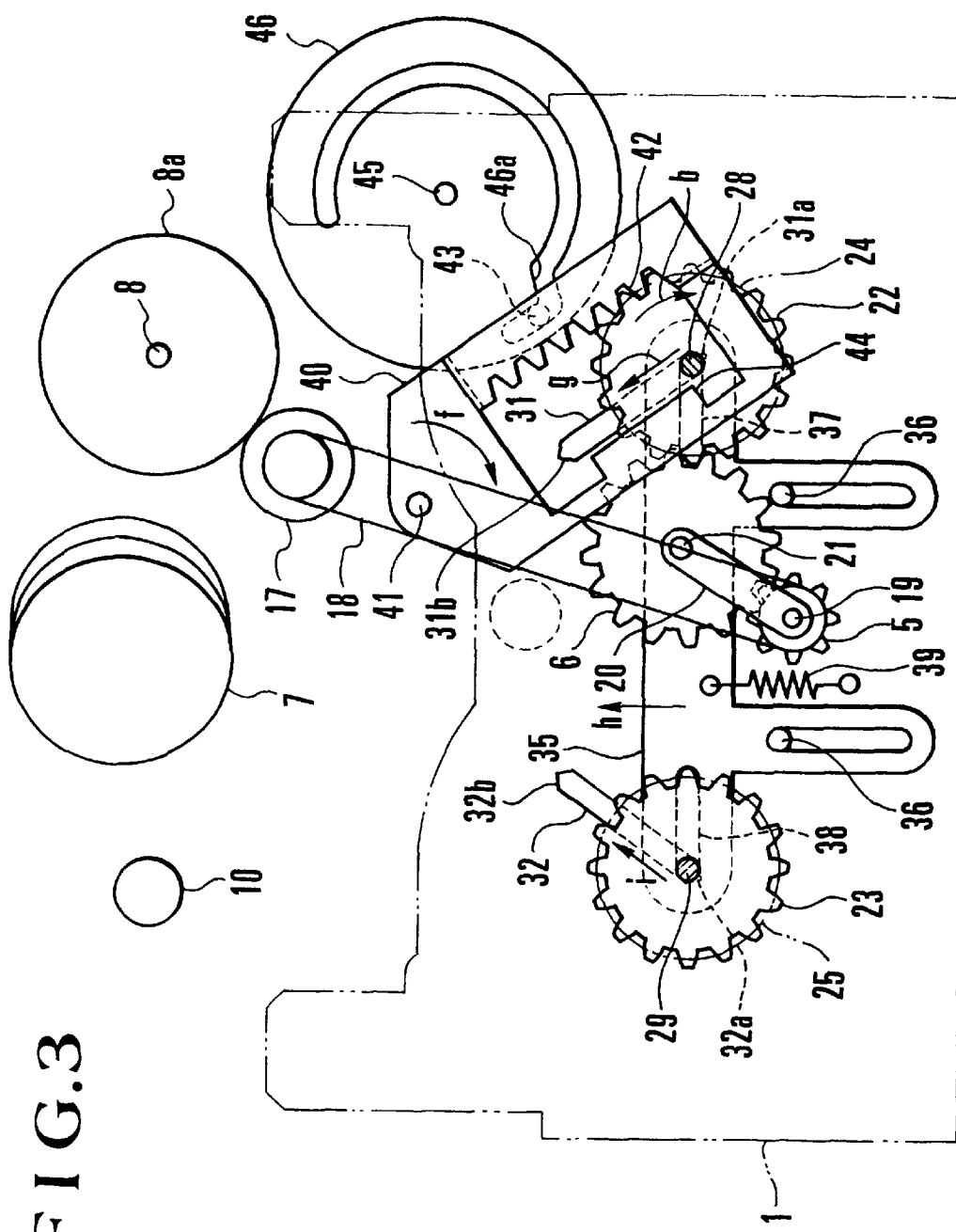
FIG. 3 is a plan view showing the whole of the reel mount moving device of the same embodiment in a state obtained when the reel mount begins to be moved from the large cassette position to a small cassette position.
Figure 4:
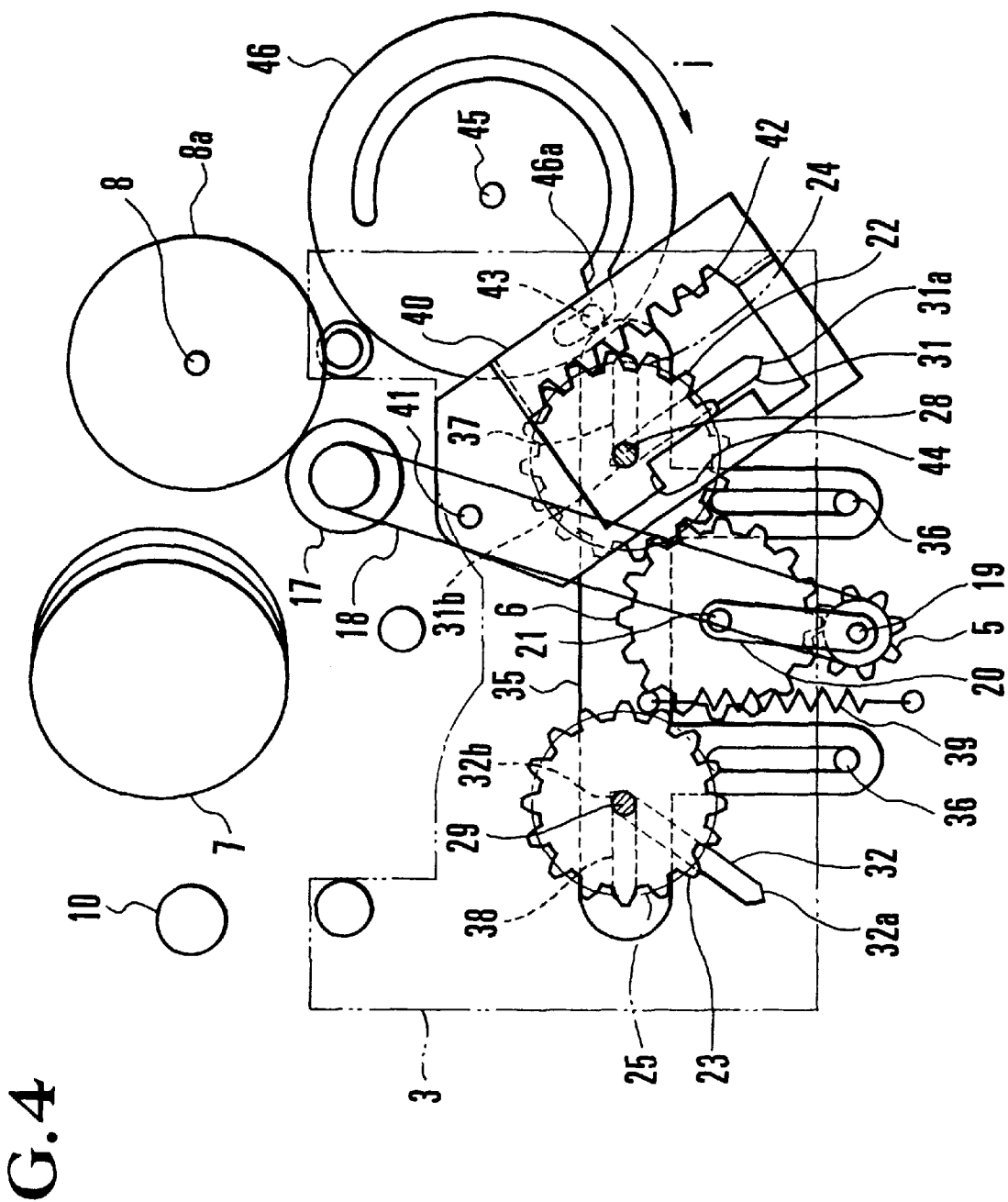
FIG. 4 is a plan view showing the whole of the reel mount moving device of the same embodiment in a state obtained at the end of the movement of the reel mount from the large cassette position to the small cassette position.
Figure 5:
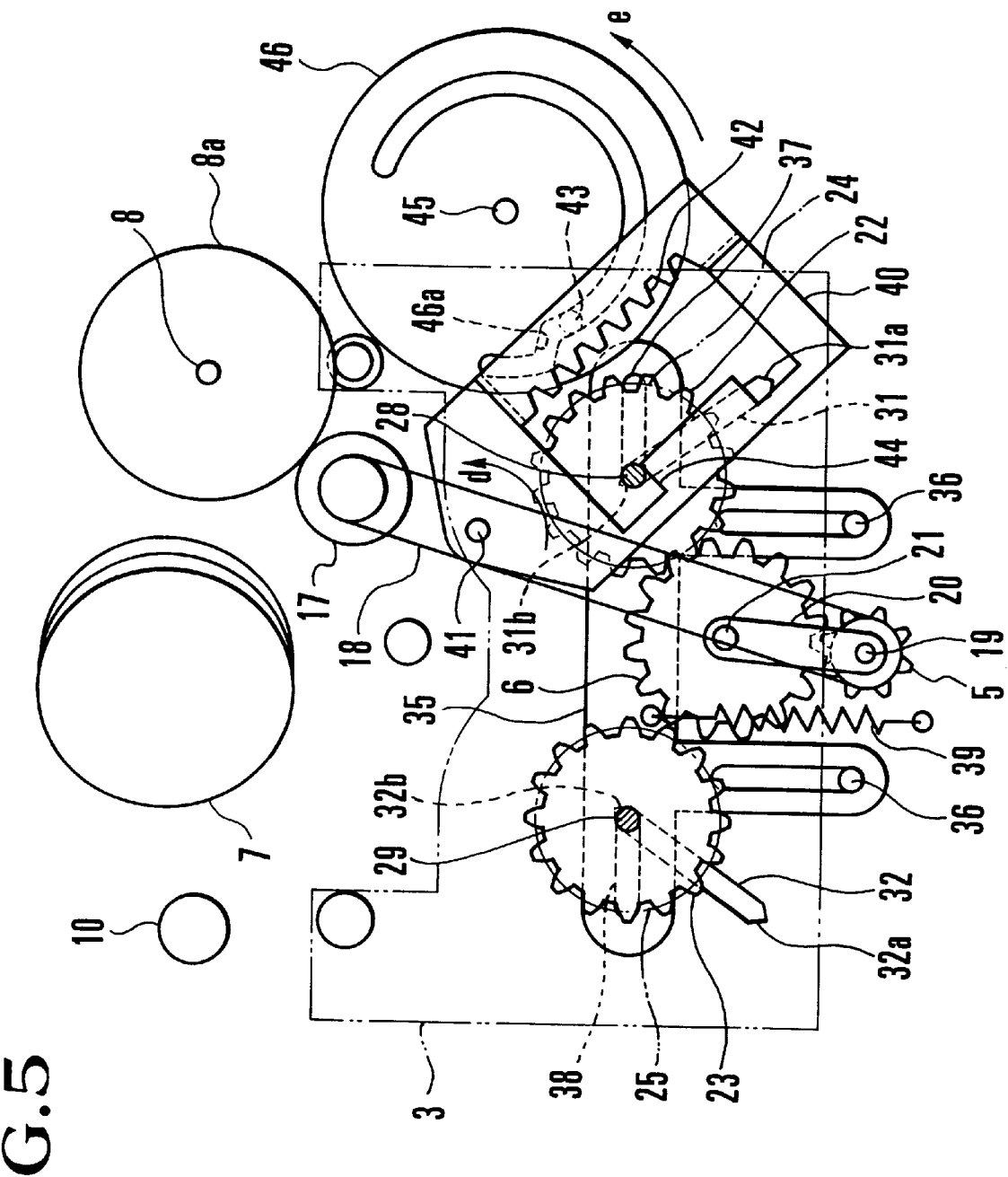
FIG. 5 is a plan view showing the whole of the reel mount moving device of the same embodiment in a state obtained with the reel mount set in the small cassette position and the small cassette made ready for recording or reproduction.
Figure 6:
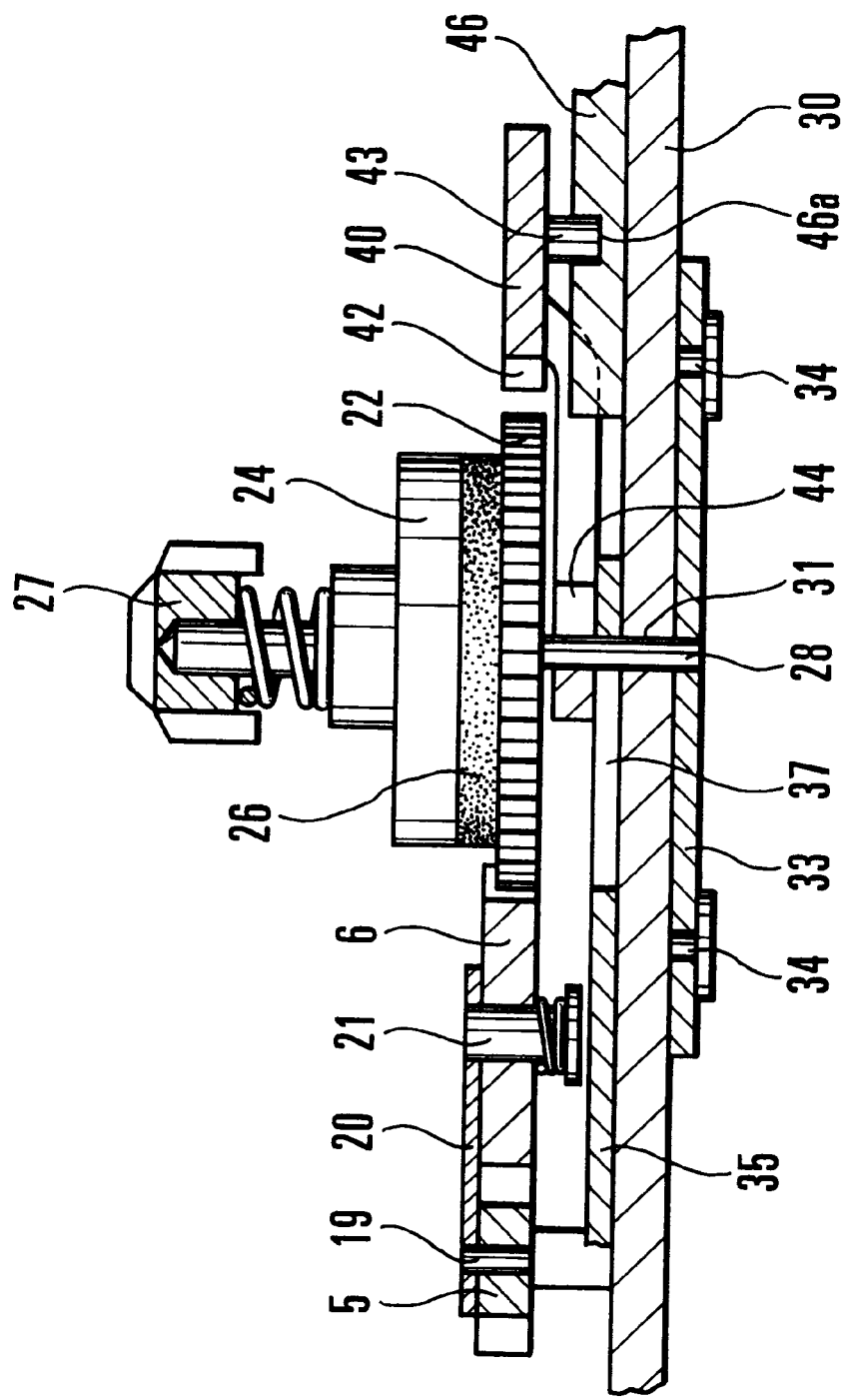
FIG. 6 is a sectional view showing the reel mount and essential parts related to a reel mount moving mechanism of the same embodiment.

FIG. 2 shows in a plan view the whole device in a state obtained with the reel mounts set in a position for a large cassette (hereinafter referred to as the large cassette position) where recording or reproduction can be carried out by using the large cassette. FIG. 3 shows in a plan view the whole device in a state obtained when the reel mounts begin to move from the large cassette position toward a position provided for a small cassette (hereinafter referred to as the small cassette position). Although, to make these reel mount positions easily distinguishable, the large cassette is shown in its outside shape in FIG. 3, in actuality, a cassette holder is in a moved-up position in the state illustrated. FIG. 4 shows in a plan view the whole device in a state obtained at the end of the movement of the reel mounts from the large cassette position to the small cassette position. Although, to make the reel mount positions easily distinguishable, the small cassette is shown in its outside shape in FIG. 4, the cassette holder is in a moved-up position in the case of FIG. 4. FIG. 5 shows in a plan view the whole device in a state obtained with the reel mounts set in the small cassette position to make the small cassette ready for recording or reproduction. FIG. 6 is a sectional view showing the reel mounts and a mechanism arranged to move the reel mounts. While the various component members are shown in FIGS. 2 to 5 for the purpose of clearly showing their horizontally relative positions, the vertical relations of their positions will be clearly understood from FIG. 6.

In the case of FIG. 2, the large cassette 1 is in a readily usable state. In this state, a rotating force in the direction of arrow "a" of a capstan 8 caused by a capstan motor which is disposed below the capstan 8 is transmitted to an intermediate gear 17 by a gear part 8a formed along the periphery of a capstan rotor. The intermediate gear 17 transmits the rotating force via a belt 18 to a reel mount driving gear 5. A swinging arm 20 which is rotatably carried by the shaft 19 of the reel mount driving gear 5 swings according to the rotating direction of the reel mount driving gear 5. A swinging gear 6 which is rotatably carried by the shaft 21 of the swinging arm 20 comes to mesh with a reel mount gear 22. As a result, a rotating force in the direction of arrow "b" is transmitted to the reel mount gear 22.

As shown in FIG. 6, a reel mount 24 is coaxially disposed on the reel mount gear 22. The reel mount gear 22 transmits a certain torque through a slip member 26 to the reel mount 24 in such a way as to drive the reel mount 24 to rotate. Further, an engaging member 27 is arranged at an upper end part of the reel mount 24 to engage the reel hub of the large or small cassette.

Further, as shown in FIG. 6, a reel shaft 28 which rotatably carry the reel mount 24 slidably engages the inside of a slot part 31 which is formed in a chassis 30. The reel shaft 28 is prevented from slanting or rattling by a slide support plate 33, which vertically supports the reel shaft 28 and is carried by shafts 34 in such a way as to be slidable relative to the chassis 30.

The other reel mount 25 is arranged in the same manner as the reel mount 24 as follows. As shown in FIG. 2, a reel shaft 29 which rotatably carries the reel mount 25 above a reel mount gear 23 slidably engages the inside of a slot part 32, which is formed in the chassis 30. The pair of the slot parts 31 and 32 are thus arranged to form moving paths for the two reel mounts 24 and 25. These slot parts 31 and 32 are provided with V-shaped stoppers 31a, 31b, 32a and 32b which are formed respectively at the both end parts of the slot parts 31 and 32.

A slide connection plate 35, which functions as a connection member or an interlocking member, is slidably carried by the chassis 30 through shafts 36. The above-stated reel shafts 28 and 29 are inserted through guide slots 37 and 38 which are formed in the slide connection plate 35. A spring 39 is arranged to urge the slide connection plate 35 to move back in the direction of arrow "c". The reel shafts 28 and 29 are thus urged to move toward the V-shaped stoppers 31a and 32a which are formed in the slot parts 31 and 32 respectively on the side of the reel mount positions corresponding to the large cassette 1.

A change-over arm 40 (moving member) is swingably carried by the chassis 30 through a shaft 41, which serves as a turning fulcrum for arm 40. The change-over arm 40 is provided with a rack part 42, a pin 43 and a protruding part 44. The rack part 42 and the protruding part 44 are formed in positions opposed to an opening which is provided in the change-over arm 40 for allowing the reel shaft 28 to be inserted therethrough. The pin 43 of the change-over arm 40 engages the cam part 46a of a cam gear 46 which is rotatably carried by a shaft 45 and is arranged to be rotated by a mode motor (not shown) in association with a tape pulling-out action and the action of a mode change-over mechanism (not shown).

With the cam gear 46 in a position shown in FIG. 2, the cam part 46a engages the pin 43 of the change-over arm 40 to have the change-over arm 40 in a state of having been swung in the direction of arrow "d". The rack part 42 is disengaged from the reel mount gear 22 and the reel shaft 28 is locked to the V-shaped stopper 31a by one end of the protruding part 44 to prevent it from moving away from the stopper 31a. Since the other reel shaft 29 is then also locked through the slide connection plate 35 to the V-shaped stopper 32a, the two reel mounts 24 and 25 are set in the large cassette position. Under this condition the large cassette 1 is usable and, as mentioned in the foregoing, the reel mount gear 22, i.e., the reel mount 24, is driven to rotate by the rotation of the capstan 8. Further, if the capstan 8 is reversely rotated, the swinging gear 6 comes to mesh with the reel mount gear 23 to drive the reel mount 25 to rotate.

FIG. 7 shows in a block diagram a control system of this embodiment. FIG. 8 shows in a timing chart the operation of the embodiment to be performed in moving the reel mounts from the large cassette position to the small cassette position.

As shown in FIG. 7, the control system consists of a cassette discriminating part 47 which is arranged to detect by means of a sensor or the like whether the large or small cassette a mounted, a reel mount position discriminating part 48 which is arranged to detect the current reel mount position also by means of a sensor or the like, and a control circuit 49 which is arranged to control a capstan driving circuit 50 and a mode motor driving circuit 51 on the basis of discrimination signals obtained from the discriminating parts 47 and 48.

Further, as shown in FIG. 8, the timing of the up and down movement of the cassette, the timing of the normal rotation, stopping and reverse rotation of the mode motor which is arranged to drive and rotate the cam gear 46, and the timing of the normal rotation of the capstan 8 by the capstan motor and the normal rotation and stopping of the capstan motor for stopping and holding the reel mounts, are respectively set at the control circuit 49.

If the large cassette 1 is ejected in the state of FIG. 2 and a mode of using the small cassette is set, the cam gear 46 is rotated in the direction of arrow "e". When the cam gear 46 reaches a position shown in FIG. 3, the cam part 46a of the cam gear 46 guides the pin 43 of the change-over arm 40 to cause the change-over arm 40 to rotate in the direction of arrow "f". The instant the protruding part 44 parts from the reel shaft 28, the rack part 42 comes to mesh with the reel mount gear 22. Since the reel mount gear 22 is being rotated in the direction of arrow "b" by a rotating force transmitted from the capstan 8 at that time, the rotation of the reel mount gear 22 causes the reel shaft 28 to be moved in the direction of arrow "g" against the force of the spring 39 along the slot part 31 together with the slide connection plate 35. At the same time, the forward movement of the slide connection plate 35 in the direction of arrow "h" causes the other reel shaft 29 to move also along the slot part 32 in the direction of arrow "i".

At the start of this movement, after the cassette is moved upward at the timing as shown in FIG. 8, the capstan 8 is caused to rotate. The mode motor is allowed to rotate the cam gear 46 after the start of rotation of the capstan 8. This arrangement of timing enables the rack part 42 of the change-over arm 40 to smoothly come to mesh with the reel mount gear 22.

Next, when the reel shafts 28 and 29 are moved along the slot parts 31 and 32 until they reach their positions as shown in FIG. 4, they abut on the V-shaped stoppers 31b and 32b. Then, since the rotation of the reel mount gear 22 is hindered by the stopping of movement of the reel shaft 28, the load current of the motor for driving the capstan 8 increases. With the load current thus increased, the control circuit 49 controls the capstan driving circuit 50 shown in FIG. 7 in such a way as to supply a predetermined current to the motor for driving the capstan 8. In other words, as shown in FIG. 8, a rotating force required for continuously stopping the slide connection plate 35 in its position shown in FIG. 4 against the force of the spring 39 is imparted to the capstan 8.

When the cam gear 46 is rotated in the direction of arrow "j" with the reel mount held in the stopped state, the change-over arm 40 is turned in the direction of arrow "d" as shown in FIG. 5. The rack part 42 then parts from the reel mount gear 22. At the same time, the other end of the protruding part 44 causes the reel shaft 28 to be locked to the V-shaped stopper 31b and not movable from there. The other reel shaft 29 is also caused through the slide connection plate 35 to be not movable from the V-shaped stopper 32b. The two reel mounts 24 and 25 are thus set in their small cassette position to permit the use of the small cassette 3.

When the VTR is set in the mode of using the large cassette with the small cassette ejected in the state as shown in FIG. 5, the embodiment again becomes as shown in FIG. 4 with the cam gear 46 rotated in the direction of arrow "e". In this instance, however, the motor for driving the capstan 8 is not energized. Therefore, the reel shafts 28 and 29 are moved from the positions shown in FIG. 4 to the positions shown in FIG. 3 by the force of the spring 39 through the slide connection plate 35. Then, with the cassette in the moved-up state, the reel mounts 24 and 25 come back to their positions which correspond to the mode of using the large cassette 1.

As apparent from the description given above, in the case of this embodiment, the rotating force of the capstan 8 is transmitted to the reel mount gear 22 through a power transmission mechanism including the intermediate gear 17, the belt 18, the reel mount driving gear 5, the swinging gear 6, etc. With the rotating force thus transmitted, the reel shaft 28, i.e., the reel mount 24, is moved through the rack part 42 of the change-over arm 40. Then, a switching mechanism consisting of the cam gear 46, the change-over arm 40, etc., acts to selectively turn on or off the transmission of the power for moving the reel mount 24. Therefore, in accordance with the invented arrangement described, the reel mount 24 can be moved by the rotating force of the capstan 8, without having recourse to the use of any motor arranged solely for the purpose of moving the reel mount 24. After that, the tape T can be transported by means of the capstan 8 for recording or reproduction in a normal manner.

Important features of this embodiment reside in that the power transmission mechanism for transmitting the rotating force of the capstan 8 to the reel mount gear 22 is used also as the mechanism of the reel mount driving system and that the mode motor which is provided for mode change-over and the cam gear 46 are utilized for driving the change-over arm 40 of the switching mechanism. While the embodiment includes no motor solely for the purpose of moving the reel mounts, the lack of such a motor virtually necessitates use of only the change-over arm 40. The reel mounts thus can be moved by a very simple arrangement.

With the swinging gear 6 used like in the case of this embodiment, the swinging gear 6 is selectively caused to mesh with the reel mount 22 or the reel mount 23 by the normal or reverse rotation of the capstan 8. Therefore, it is impossible to move the reel mount 24 from the small cassette position to the large cassette position by forcibly causing the reel mount gear 22 to reversely rotate by means of the capstan 8. It is, therefore, necessary to have some other power transmission mechanism for causing the reel mount 24 to move backward. However, in the case of this embodiment, the reel mount 24 can be very easily moved backward by the use of the slide connection plate 35 and the spring 39 without having recourse to any other power transmission mechanism.

In the embodiment described, one reel shaft 28 is interlocked with the other reel shaft 29 by means of the slide connection plate 35. The interlocking arrangement enables the reel mount 25 to smoothly move at the same time as the reel mount 24 moves. The two reel mounts 24 and 25 also can be reliably moved back by the backward movement of the slide connection plate 35.

Further, in the case of the embodiment, the reel shafts 28 and 29 are arranged to slidably engage the slot parts 31 and 32 provided in the chassis 30 while the V-shaped stoppers 31a, 31b, 32a and 32b are formed at both ends of the slot parts 31 and 32. Therefore, the two reel mounts 24 and 25 can be guided and positioned very simply and at a high degree of precision by this arrangement. The change-over arm 40 is provided with the protruding part 44 for locking the reel shaft 28, which is interlocked with the other reel shaft 29 by the slide connection plate 35. That arrangement thus enables the two reel mounts 24 and 25 to be very reliably positioned without recourse to any other additional locking member.

While one embodiment of this invention has been described by way of example, this invention is not limited to the embodiment and various changes and variations thereto may be made without departing from the technical concept and spirit of this invention. For example, while the reel mounts are arranged to be driven by utilizing the rotating force of the capstan in the case of the embodiment, this invention likewise applies also to a device having a reel mount driving motor. Further, while the reel mounts are arranged, in the case of the embodiment described, to be moved forward by the power (rotating force) of the capstan from the large cassette position to the small cassette position and to be moved backward from the small cassette position to the large cassette position by means of a spring power, these forward and backward moving powers may be conversely arranged.

In accordance with the arrangement of the embodiment described, the reel mounts are moved by using the power of the tape transporting drive source, so that an expensive and large motor which has been used only for the purpose of moving the reel mounts by the conventional device can be dispensed with. The invented arrangement thus not only permits reduction in cost but also permits reduction in size of the device with the space for such a motor becoming no longer necessary.

What is claimed is:

1. A reel mount moving device adapted for use with a recording and/or reproduction apparatus having a driving source for driving a recording medium to transport the medium for recording information thereon and/or reproduction of information therefrom, said real mount moving device moving a movably mounted reel mount unit to a position of each reel contained in each of a plurality of cassettes of different sizes in correspondence with selective mounting of one of the plurality of cassettes, comprising:

a) a converting mechanism having a moving member for converting power from the driving source into a force for moving said reel mount unit by engagement of said moving member with said reel mount unit, said moving member having a turning fulcrum and a gear part which selectively engages a gear part located at a periphery of said reel mount unit; and b) a switching mechanism for switching said moving member and said reel mount unit selectively to engage each other or to disengage from engagement with each other, said switching mechanism having a cam, said cam engaging said moving member and thereby causing the gear part of said moving member and the gear part of said reel mount unit to engage each other or to disengage from engagement with each other.

2. A device according to claim 1, wherein said driving source for driving the recording medium is a motor arranged to rotate a capstan.

3. A device according to claim 1, further comprising a connection member, and wherein said reel mount unit includes a pair of reel mounts, portions of said pair of reel mounts being interlocked with each other by said connection member.

4. An apparatus according to claim 3, further comprising an urging member arranged to urge said connection member in one direction, said connection member being movably mounted.

5. A recording and/or reproducing apparatus arranged to permit one of a plurality of cassettes of different sizes to be selectively mounted thereon, comprising:

a) a head arranged to record or reproduce information on or from a tape contained in each of said plurality of cassettes;

b) transport means for transporting the tape into recording or reproducing relation relative to said head;

c) a movably mounted reel mount unit arranged to be rotated by a driving force of said transport means;

d) a converting mechanism having a moving member for converting some of the driving force of said reel mount unit into a force for moving said reel mount unit by engagement of said moving member with said reel mount unit, said moving member having a turning fulcrum and a gear part, said gear part of said moving member selectively engaging a gear part located at a periphery of said reel mount unit; and e) a switching mechanism for switching said moving member and said reel mount unit selectively to engage each other or to disengage from engagement with each other, said switching mechanism having a cam, said cam engaging said moving member and thereby causing the gear part of said moving member and the gear part of said reel mount unit to engage each other or to disengage from engagement with each other.

6. An apparatus according to claim 5, wherein said transport means is a capstan.

7. An apparatus according to claim 5, further comprising a connection member, and wherein said reel mount unit includes a pair of reel mounts, portions of said pair of reel mounts being interlocked with each other by said connection member.

8. An apparatus according to claim 7, further comprising an urging member arranged to urge said connection member in one direction, said connection member being movably mounted.

* * * * *

UNITED STATES PATENT AND TRADEMARK OFFICE
CERTIFICATE OF CORRECTION

PATENT NO. : 5,901,914
DATED : May 11, 1999
INVENTOR(S) : Hidetoshi Matsuoka, et al.

It is certified that error appears in the above-identified patent and that said Letters Patent is hereby corrected as shown below:

Column 4, line 47, delete "a" (first occurrence) and insert --is--.
Column 7, line 15, delete "real" and insert --reel--.

Signed and Sealed this

Twenty-seventh Day of June, 2000

Attest:

Q. TODD DICKINSON

*Attesting Officer*  *Director of Patents and Trademarks*